US012786802B2

(12) United States Patent
Soryal

(10) Patent No.: US 12,786,802 B2
(45) Date of Patent: Nov. 3, 2026

(54) DYNAMIC CONTINUOUS QUALITY OF SERVICE ADJUSTMENT SYSTEM

(71) Applicant: AT&T Intellectual Property I, L.P., Atlanta, GA (US)

(72) Inventor: Joseph Soryal, Glendale, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 705 days.

(21) Appl. No.: 17/663,962

(22) Filed: May 18, 2022

(65) Prior Publication Data

US 2023/0379763 A1 Nov. 23, 2023

(51) Int. Cl.
*H04W 28/24* (2009.01)
*H04W 24/06* (2009.01)
*H04W 28/02* (2009.01)

(52) U.S. Cl.
CPC ........... *H04W 28/24* (2013.01); *H04W 24/06* (2013.01); *H04W 28/0215* (2013.01); *H04W 28/0268* (2013.01)

(58) Field of Classification Search
CPC . H04W 28/24; H04W 24/06; H04W 28/0268; H04L 41/16; H04L 41/145
See application file for complete search history.

(56) References Cited

U.S. PATENT DOCUMENTS 10,574,980 B1 * 2/2020 Batiz ........................ G06T 7/248
10,791,026 B2 * 9/2020 Tomkins ............. H04L 67/5682
11,765,623 B1 * 9/2023 Cai ........................ H04W 28/24 370/229
2017/0061214 A1 * 3/2017 Huang ................. H04N 7/0117
2018/0014082 A1 * 1/2018 Daily ................. H04N 21/2743
2020/0136991 A1 * 4/2020 Salgueiro ............ H04L 41/0894
2022/0191592 A1 * 6/2022 Gairuboina ...... H04N 21/44209
2022/0417840 A1 * 12/2022 Pathania ................ G06N 20/20
2023/0137968 A1 * 5/2023 Stockhammer ... H04W 28/0268 370/235

(Continued)

FOREIGN PATENT DOCUMENTS

WO WO-2021014267 A1 * 1/2021 ........ H04W 28/0268
WO WO-2021215886 A1 * 10/2021

OTHER PUBLICATIONS

Developedia | "5 G Quality of Service". webpage https://devopedia.org/5g-quality-of-service, last accessed Mar. 24, 2022, 11 pages.

*Primary Examiner* — Kevin C. Harper
*Assistant Examiner* — Salma Ayad
(74) *Attorney, Agent, or Firm* — Guntin & Gust, PLC; Louis Yang

(57) ABSTRACT

Dynamic, continuous quality of service adjustment (e.g., using a computerized tool) is enabled. For example, a system can comprise: a processor and a memory that stores executable instructions that, when executed by the processor, facilitate performance of operations, comprising: determining a condition associated with a user profile, wherein the user profile is associated with a mobile device, determining a quality of service metric representative of a quality of service of a data transmission, via a radio access network, between the mobile device and network equipment, and based on the condition, modifying a quality of service parameter, wherein modifying the quality of service parameter comprises modifying the quality of service.

20 Claims, 10 Drawing Sheets

(56) References Cited

U.S. PATENT DOCUMENTS

| | | | | |
|---|---|---|---|---|
| 2023/0199669 | A1* | 6/2023 | Vannithamby | H04W 52/06<br>455/127.1 |
| 2024/0098775 | A1* | 3/2024 | Szabó | H04L 41/0894 |
| 2024/0129830 | A1* | 4/2024 | Xu | H04W 36/033 |

* cited by examiner

DYNAMIC CONTINUOUS QUALITY OF SERVICE ADJUSTMENT SYSTEM

TECHNICAL FIELD

The disclosed subject matter relates to telecommunications and, more particularly, to dynamic continuous quality of service adjustment for a network.

BACKGROUND

With each new generation of cellular networks, mobile connectivity becomes increasingly ubiquitous. More and more devices are becoming internet connected, and cellular network bandwidths continue to increase to accommodate the increased demand. However, network constraints still exist, and in some locations, or at certain times, cellular networks can still become congested, leading to poor performance for connected devices. In order to mitigate network congestion, existing solutions throttle one or more connections to a congested cellular network. However, such throttling is often based on tiers of mobile network plans, with the highest-pricing tiers generally subjected the least throttling. Such throttling can be inefficient, and often does not offer sufficient quality of service for other users that may require a higher quality of service.

The above-described background relating to telecommunications is merely intended to provide a contextual overview of some current issues and is not intended to be exhaustive. Other contextual information may become further apparent upon review of the following detailed description.

DETAILED DESCRIPTION

Figure 1:
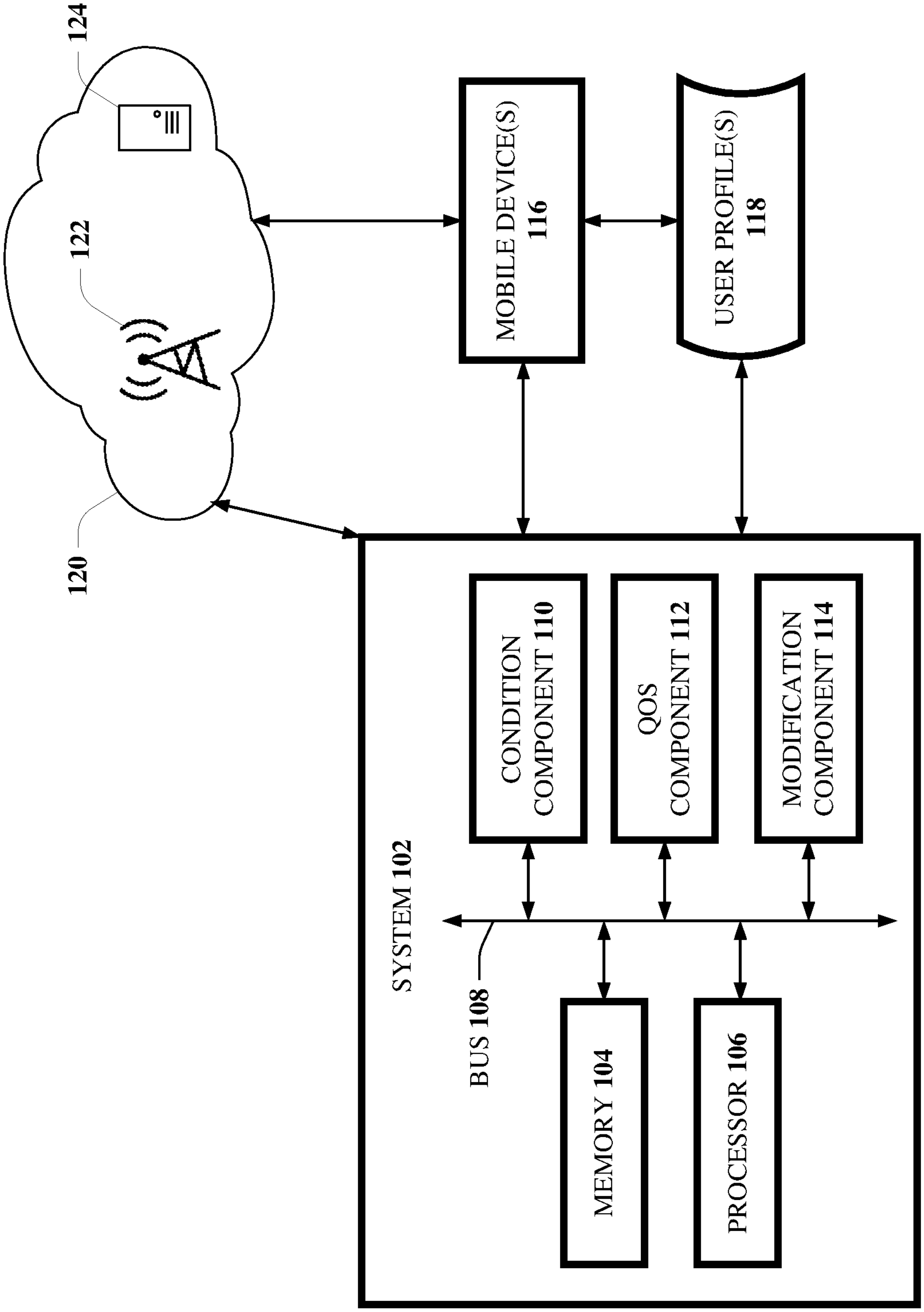
FIG. 1 is a block diagram of an exemplary system in accordance with one or more embodiments described herein.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As alluded to above, quality of service adjustment (e.g., for a cellular network) can be improved in various ways, and various embodiments are described herein to this end and/or other ends.

According to an embodiment, a system can comprise a processor, and a memory that stores executable instructions that, when executed by the processor, facilitate performance of operations, comprising: determining a condition associated with a user profile, wherein the user profile is associated with a mobile device, determining a quality of service metric representative of a quality of service of a data transmission, via a radio access network, between the mobile device and network equipment, and based on the condition, modifying a quality of service parameter, wherein modifying the quality of service parameter comprises modifying the quality of service.

In one or more embodiments, modifying the quality of service parameter can comprise modifying a bandwidth of the data transmission. In further embodiments, modifying the quality of service parameter can comprise modifying a quality of service class identifier of the data transmission.

In various embodiments, determining the condition can comprise: based on the data transmission, simulating, using an artificial intelligence process, a user experience applicable to the mobile device, and in response to simulating the user experience, determining the condition. In this regard, the data transmission can comprise a transmission of a video, the condition can comprise a resolution of the video, and modifying the quality of service parameter can comprise modifying the resolution of the video. In further embodiments, the above-operations can further comprise: determining, using the artificial intelligence process, a user preference associated with the user profile and associated with the condition, wherein modifying the quality of service parameter is based on the user preference.

In one or more implementations, the condition can comprise an occurrence of an event at a location, and modifying the quality of service parameter can comprise modifying the quality of service parameter in response to a determination that the mobile device is within a threshold distance of the location. In further implementations, the condition can comprise an occurrence of an event at a defined time, and modifying the quality of service parameter can comprise modifying the quality of service at the defined time.

In another embodiment, a non-transitory machine-readable medium can comprise executable instructions that, when executed by a processor, facilitate performance of operations, comprising: determining a condition associated with a user profile, wherein the user profile is associated with a user equipment, determining a quality of service metric representative of a quality of service of a data transmission, via a radio access network, between the user equipment and network equipment, and based on the condition, modifying a quality of service parameter, wherein modifying the quality of service parameter results in the quality of service being modified.

In various embodiments, the above operations can further comprise: receiving a request from a web server associated with the user profile, wherein determining the condition comprises determining the condition based on the request. In one or more implementations, the condition can comprise defined network activity between the user equipment and the web server. It is noted that, in one or more embodiments, the defined network activity can comprise a relative importance determined to be higher than relative importances of other data transmissions between the network equipment and other user equipment, other than the user equipment. In further embodiments, the relative importance and the relative importances can be determined using a network activity model, and wherein the network activity model can be generated based on machine learning applied to past data transmissions other than the data transmission and the data transmissions.

In one or more embodiments, the network equipment can comprise network equipment that communicates according to at least a fifth generation network communication protocol.

According to yet another embodiment, a method can comprise: determining, by network equipment comprising a processor, a condition associated with a user profile, wherein the user profile is associated with a mobile device, determining, by the network equipment, a quality of service metric representative of a quality of service of a data transmission of the mobile device via a radio access network, and based on the condition, modifying, by the network equipment, a quality of service parameter, wherein modifying the quality of service parameter modifies the quality of service.

In various embodiments, the above method can further comprise: based on the quality of service, generating, by the network equipment, a test to be presented via the mobile device, wherein the quality of service is modified based on a result of the test.

In one or more embodiments, the above method can further comprise: identifying, by the network equipment, an event threshold likely to reduce the quality of service by at least a defined amount, and based on the condition and the event, allocating, by the network equipment, a defined quality of service for a defined amount of time to the mobile device. In this regard, the method can further comprise: based on the event, reducing, by the network equipment, a first throughput of a first type of data transmission, of the data transmission, and further based on the event, increasing, by the network equipment, a second throughput of a second type of data transmission, of the data transmission, different from the first type of data transmission.

In various implementations, the user profile can be a first user profile, the quality of service parameter can be a first quality of service parameter, and the mobile device can be a first mobile device. In this regard, the data transmission of the first mobile device, via the radio access network, can be between the first mobile device and a second mobile device associated with a second user profile, and the method can further comprise: based on modifying the first quality of service parameter, modifying a second quality of service parameter corresponding to the second mobile device.

In one or more embodiments, modifying the quality of service parameter can comprise modifying a network slice, of the radio access network, comprising the data transmission.

It should be appreciated that additional manifestations, configurations, implementations, protocols, etc. can be utilized in connection with the following components described herein or different/additional components as would be appreciated by one skilled in the art.

Turning now to FIG. 1, there is illustrated an example, non-limiting system 102 in accordance with one or more embodiments herein. System 102 can comprise a computerized tool, which can be configured to perform various operations relating to quality of service adjustment. The system 102 can comprise one or more of a variety of components, such as memory 104, processor 106, bus 108, condition component 110, quality of service (QoS) component 112, and/or modification component 114. In various embodiments, the system 102 can be communicatively coupled to, or can further comprise, mobile device(s) 116, user profile(s) 118, radio access network (RAN) 120, network equipment 122, and/or server 124. In various embodiments, one or more of the memory 104, processor 106, bus 108, condition component 110, QoS component 112, modification component 114 mobile device(s) 116, user profile(s) 118, RAN 120, network equipment 122, and/or server 124 can be communicatively or operably coupled (e.g., over a bus or wireless network) to one another to perform one or more functions of the system 102.

According to an embodiment, the condition component 110 can determine a condition associated with a user profile (e.g., a user profile of the user profile(s) 118). In this regard, the user profile can be associated with a mobile device (e.g., a mobile device of the mobile device(s) 116). In various implementations, a condition herein can comprise one or more of a condition associated with a video transmission, audio transmission, virtual meeting, video call, audio call, virtual reality or augmented reality experience, meeting, or gathering, an occurrence of an event at a defined time, an occurrence of an event at a defined location, network activity (e.g., between the mobile device and a system or server herein), a transaction, a resolution, bandwidth, bitrate, latency, jitter, or other or another suitable condition. In various embodiments, a mobile device herein can comprise a smartphone, computer, tablet, camera, PDA, wearable device, augmented reality device, virtual reality device, extended reality device (e.g., for use in a metaverse), or another suitable mobile device. It is noted, however, that the system 102 (and other systems herein) are not limited to use with mobile devices, and that other internet connected devices, vehicles, appliances, etc. can be utilized herein. In one or more embodiments, a condition herein can be determined (e.g., by the condition component 110) using historical data (e.g., time data, location data, activity data, transactional data, etc.) associated with the user profile, calendar data associated with the user profile, communication data (e.g., email, call, text, chat, etc.) associated with the user profile, predicted using artificial intelligence or machine learning (as later discussed in greater detail), extended reality data, or can otherwise be determined.

According to an embodiment, the QoS component 112 can determine a quality of service metric representative of a quality of service of a data transmission via a RAN 120 (e.g., between the mobile device and network equipment 122 and/or system 102). In various implementations, a quality of service metric herein can comprise one or more of a bandwidth, bitrate, latency, packet loss, errors, throughput, transmission delay, availability, jitter, or another suitable quality of service metric (e.g., between a mobile device and another suitable device, component, RAN, and/or system herein).

In various embodiments, the network equipment 122 can comprise network equipment (e.g., network core, RAN, transmission equipment, switches, customer premises equipment, network nodes, or other suitable network equipment) that communicates according to at least a fourth or fifth generation network communication protocol. In this regard, the network equipment 122 can comprise network equipment that communicates according to a fourth generation network communication protocol, fifth generation network communication protocol, sixth generation network communication protocol, or another suitable network communication protocol.

In one or more embodiments, the condition component 110 can identify an event threshold likely to reduce the quality of service by at least a defined amount. For example, the condition component 110 can analyze one or more sources (e.g., news outlets, social media, chats for accidents, games, gatherings, or other suitable sources) for an occurrence of an event. Next, the condition component 110 can determine whether the event is threshold likely to reduce QoS by at least a defined amount (e.g., a threshold amount). In another example, a system herein can be utilized to balance QoS to optimize limited network connectivity or bandwidth (e.g., in an area with compromised cellular network connectivity or QoS). For instance, QoS adjustments (e.g., via a system herein) can be content-specific (e.g., in a comprised region, gaming can be deemphasized (e.g., not provided a high QoS, but news or messaging can be emphasized (e.g., provided a relatively higher QoS) by a system herein). In this regard, the QoS component 112 can, based on the condition and/or the event, allocate a defined quality of service for a defined amount of time to a mobile device. In an example, one million people in a comprised region can attempt to utilize a bandwidth-limited network (e.g., via respective mobile devices). In this example, the modification component 114 can unilaterally lower QoS for all mobile devices, then increase QoS for individual mobile devices in increments (e.g., four minute increments) in order to attempt to give each user an opportunity to make a call or send a message. In this regard, a warning can be presented (e.g., via a system herein) near or at an end of a QoS time allotment. In further embodiments, the modification component 114 can, based on the event, reduce a first throughput of a first type of data transmission (e.g., an online game transmission), of the data transmission. The QoS component 112 can then, further based on the event, increase a second throughput of a second type of data transmission (e.g., a call or a text message), of the data transmission. In this regard, the first type of data transmission can be different from the second type of data transmission. According to an embodiment, the modification component 114 can, based on a condition herein, modify a quality of service parameter herein. In this regard, modifying the quality of service parameter can comprise modifying the quality of service. In various embodiments, modifying the quality of service parameter can comprise modifying a bandwidth of the data transmission. In further embodiments, modifying the quality of service parameter can comprise modifying a quality of service class identifier (e.g., QCI, 5QI, or another suitable QoS identifier) of the data transmission.

In one or more embodiments, a condition herein can comprise an occurrence of an event at a location (e.g., a defined location). For example, if a user is determined (e.g., via the condition component 110) to be attending a sporting event or visiting a client site, and the QoS component 112 determines that it is important for the mobile device to be able to download a file (e.g., a work file), the modification component 114 can adjust QoS accordingly. Such determinations (e.g., by the condition component 110) can be based on past activity associated with a respective user, mobile device, user profile, and/or based on community data (e.g., a plurality of users, mobile devices, or user profiles). In an example, a popular location at a theme park can be determined (e.g., by the condition component 110) to be associated with an increase of social media uploads (e.g., at the popular location). Therefore, the modification component 114 can increase QoS in response to a determination (e.g., by the condition component 110) that a mobile device is within a threshold distance of the popular location at the theme park. Similarly, a campsite (e.g., at an edge of RAN coverage) before a hiking trail can be determined (e.g., by the condition component 110 and/or ML component 206) to be a popular location for sending communications prior to leaving network coverage (e.g., system 102 determined that prior users lost coverage for an average of two hours after reaching the campsite). Therefore, the modification component 114 can increase QoS in response to a determination (e.g., by the condition component 110) that a mobile device is within a threshold distance of the campsite. In another example, the condition component 110 and/or ML component 206 can determine a work area associated with a user of a mobile device, and upon arrival of the user and mobile device to the work area (e.g., as determined by the condition component 110), cause the modification component 114 to increase QoS. Similarly, presence of a mobile device at a sensitive or critical facility (e.g., as determined by the condition component 110 via GPS or Wi-Fi location of the mobile device), such as a hospital, can cause the modification component 114 to increase QoS for the mobile device. In this regard, modifying (e.g., by the modification component 114) the quality of service parameter can comprise modifying (e.g., by the modification component 114) the quality of service parameter in response to a determination that the mobile device is within a threshold distance of a location.

According to another embodiment, the condition herein can comprise an occurrence of an event at a defined time (e.g., as determined by the condition component 110). For example, if user profile is associated with a 9:00 AM-5:00 PM weekday work schedule, or if a user has an event stored in a calendar associated with a respective user profile, the condition component 110 can determine or predict a time-based condition. In another example, if the condition component 110 determines that every morning a user calls his boss, the condition component 110 can determine or predict a time-based condition. The modification component 114 can then increase QoS (e.g., for a defined period of time corresponding to the time-based condition) so that the call between the user and boss successfully connects and/or affords a sufficient bandwidth. In another example, in order to compensate for increased QoS for the call between the above user and the above boss, the modification component can lower bandwidth of gaming devices in the same household as the user. Thus, in various embodiments herein, modifying (e.g., by the modification component 114) the quality of service parameter can comprise modifying (e.g., by the modification component 114) the quality of service at the defined time.

In various implementations, a user profile herein can comprise a first user profile, the quality of service parameter herein can comprise a first quality of service parameter, and a mobile device herein can comprise a first mobile device. In this regard, data transmission of the first mobile device (e.g., via the RAN 120) can be between the first mobile device and a second mobile device (e.g., associated with a second user profile). Further in this regard, the modification component 114 can, based on modifying the first quality of service parameter, modify a second quality of service parameter corresponding to the second mobile device. For example, if the modification component 114 increases QoS for a first mobile device (e.g., based on a determination by the condition component 110, QoS component 112, or another component herein) for a video chat with a second mobile device, the modification component 114 can then increase QoS for a second mobile device (e.g., so that both users can experience the increased QoS). In this regard, increasing QoS for the first mobile device would not be wasted (e.g., if the second mobile device were experiencing a low QoS).

In another embodiment, QoS can be modified (e.g., by the modification component 114) in groups (e.g., of mobile devices). In this regard, the QoS component 112 and/or modification component 114 set a group of mobile devices to a common QoS level (e.g., a group of players for the same game, certain employees on a web conference, a virtual classroom, inhabitants in a natural or man-made disaster stricken area, etc.) For example, proximity of mobile devices herein can be determined (e.g., by the condition component 110). The modification component 114 can then modify a QoS (e.g., for a group of mobile devices) based on the proximity of the mobile devices to one another or to a defined location. In another example, a group of employees can be on a business trip (e.g., as determined by the condition component 110 or as registered with the system 102). In this regard, QoS for each mobile device (of the group of employees) can be increased for the duration of the business trip. Afterward, for instance, QoS can be reverted to a prior state.

In one or more embodiments, modifying (e.g., by the modification component 114) the quality of service parameter can comprise modifying (e.g., by the modification component 114) a network slice (e.g., of the RAN 120) comprising the data transmission herein. For example, two different parents (e.g., with respective mobile devices) can be at a stadium (e.g., as determined by the condition component 110), and the rest of the attendees can be general spectators (e.g., as determined by the condition component 110). The modification component 114 can then allocate the two parents to a single network slice (e.g., a fifth-generation network slice) (e.g., of heightened QoS) and allocate the rest of the attendees a different slice of a lower QoS (e.g., lower than the slice associated with the two parents) (e.g., lower bandwidth).

It is noted that one or more of a variety of components or systems herein can initiate a QoS adjustment herein. For example, one or more of a user equipment, network core, RAN (e.g., RAN 120), web application (e.g., of the RAN 120, network equipment 122, server 124, system 102, or of another system or component herein) can initiate a QoS adjustment herein.

In various embodiments, if a condition herein (e.g., a defined condition) is determined (e.g., via the condition component 110) to be occurring or is predicted or determined (e.g., via an artificial intelligence process or via machine learning herein) to occur in the future, QoS can be adjusted accordingly (e.g., via the modification component 114). In this regard, QoS can be manually and/or automatically (e.g., via a system herein) configured by location (e.g., workplace, client facility, game, etc.) In various implementations, a QoS adjustment herein can be triggered by location or event (e.g., a condition) and corresponding proximity of a mobile device (e.g., as determined via the condition component 110). In one or more embodiments, QoS herein can be manually and/or automatically (e.g., via a system herein) configured by time of day, week, month, season, etc. For example, if a user (e.g., associated with a user profile and/or mobile device herein) is attending a wedding or a birth of a baby at a hospital (e.g., a condition herein), it is desirable to have a relatively high QoS (e.g., relative to other users of a common RAN 120). The foregoing can be determined (e.g., via the condition component 110) based on analysis of user chats or text messages, reservations, GPS setting in a corresponding vehicle, or otherwise determined, which can be indicative of an important time for a respective user, thus necessitating a higher QoS than normal. In another example, if a parent attends his child's sporting event, and there are two-thousand people in attendance, overall network quality for users of a common RAN 120 can be low due to network congestion. However, if the parent has important news to share (e.g., that his son is playing for the first time) (e.g., as determined via the condition component 110 and/or via an artificial intelligence process or via machine learning herein) the modification component 114 can preference a communication via a mobile device of the parent, and thus increase QoS for that communication accordingly.

In another example, if a RAN 120 comprises fiber optic and a copper link, and a system herein (e.g., system 102) determines (e.g., via QoS component 112) to provide a user a better QoS, the modification component 114 can move the user from the copper link to the fiber optic connection. In another example, if a user has an important meeting with her client or her boss, the user can manually request an increased QoS for that period of time (e.g., for a fee). In yet another example, a user can be on vacation in a beach town where there is not strong cellular coverage (e.g., as determined via the condition component 110 and/or via an artificial intelligence process or via machine learning herein), so a system herein (e.g., via the modification component 114) can adjust QoS so that the user receives an increased QoS in order to maintain connectivity for work.

According to an embodiment, the RAN 120 or a system herein can utilize multiple-input and multiple-output (MIMO) and/or leverage peer RANs to improve user experience. In various embodiments, more than one RAN 120 can collectively serve a single mobile device (e.g., to improve QoS). Various embodiments herein can leverage QoS as a service (QoSaaS). In this regard, entities can register with the RAN 120 (e.g., for a fee) to provide QoS levels for content associated with the entities.

Figure 2:
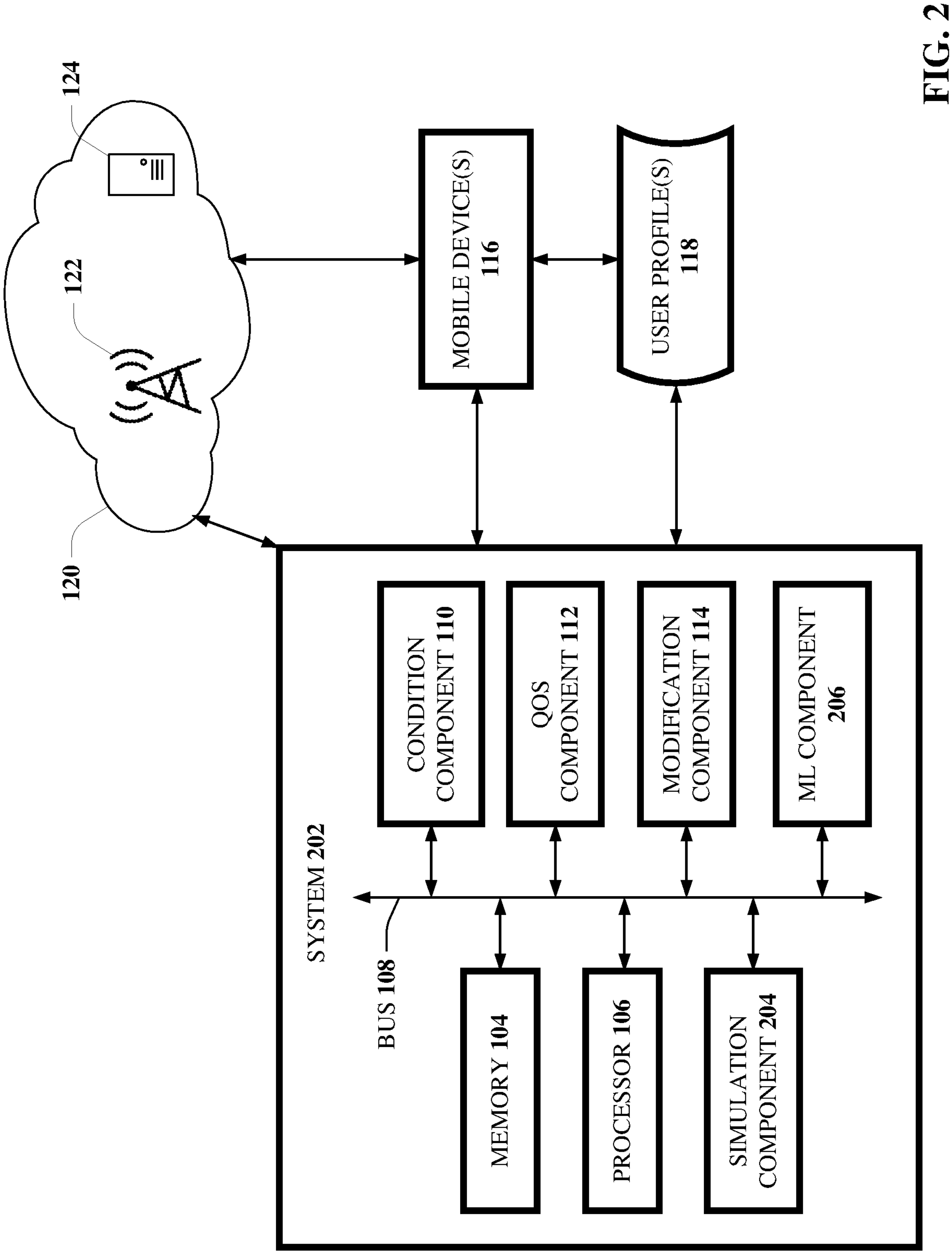
FIG. 2 is a block diagram of an exemplary system in accordance with one or more embodiments described herein.

Turning now to FIG. 2, there is illustrated an example, non-limiting system 202 in accordance with one or more embodiments herein. System 202 can comprise a computerized tool, which can be configured to perform various operations relating to quality of service adjustment. The system 202 can be similar to system 102, and can comprise one or more of a variety of components, such as memory 104, processor 106, bus 108, condition component 110, QoS component 112, and/or modification component 114. In various embodiments, the system 102 can be communicatively coupled to, or can further comprise, mobile device(s) 116, user profile(s) 118, RAN 120, network equipment 122, and/or server 124. The system 202 can further comprise a simulation component 204 and/or machine learning (ML) component 206. In various embodiments, one or more of the memory 104, processor 106, bus 108, condition component 110, QoS component 112, modification component 114 mobile device(s) 116, user profile(s) 118, RAN 120, network equipment 122, server 124, simulation component 204, and/or ML component 206 can be communicatively or operably coupled (e.g., over a bus or wireless network) to one another to perform one or more functions of the system 202.

According to an embodiment, determining a condition herein (e.g., via the condition component 110) can comprise utilization of a simulation. In an implementation, the simulation component 204 can, based on a data transmission herein, simulate (e.g., using an artificial intelligence process and/or machine learning via ML component 206), a user experience applicable to a mobile device herein. In this regard, the condition component 110 can, in response to simulating the user experience, determine the condition. In various embodiments, a data transmission can comprise a transmission of a video. In this regard, the condition can comprise a resolution of the video, and modifying (e.g., via the modification component 114) the quality of service parameter can comprise modifying the resolution of the video.

According to an embodiment, the simulation component 204 can simulate use of a mobile device (e.g., by a user and/or user profile associated with the mobile device). In this regard, the simulation component 204 can assume (e.g., simulate) a role of the user of a mobile device herein (e.g., beyond merely evaluating raw data packets). According to an example, if a user is watching a movie on a corresponding mobile device, the simulation component 204 can "watch" the movie in the background. In this regard, instead of just interjecting the packet flow, the simulation component 204 can perceive what the user perceives, or listen to what the user hears (e.g., via the mobile device). The simulation component 204 can therefore simulate the final product of a medium, not just the corresponding packets or bits. For example, the simulation component 204 can assume the role of a user (e.g., via AI module or ML component 206) and see and listen to the screen of a mobile device (e.g., as the user) to determine the actual user experience (not only via packet monitoring). In this regard, the simulation component 204 can employ image and/or audio processing. According to an embodiment, the simulation component 204 can imitate a user of a mobile device, access a duplicate feed (e.g., from the server 124) and can see and listen, and make commands as if the user is actually behaving, but without impacting the actual user interaction with the server 124. In various embodiments, the simulation component 204 can utilize small packet sizes and short intervals to save bandwidth. In various embodiments, the simulation component 204 can (e.g., via an artificial intelligence process or using ML via ML component 206) anticipate an action of a user of a mobile device. For example, if a user is predicted (e.g., via the simulation component 204 and/or ML component 206) to execute an action via the mobile device, the simulation component 204 can test this action (e.g., in the background) so that the QoS component 112 can evaluate QoS for the predicted action.

According to an example, if a user is determined (e.g., via the condition component 110) to move a mobile device herein close to his eyes, the QoS component 112 can determine that corresponding video displayed via the mobile device is not sufficiently clear to the user. The modification component 114 can therefore increase QoS (e.g., by finding a better RAN or increasing resolution on the mobile device or corresponding data transmission). In various implementations, after modifying QoS (e.g., via the modification component 114), the ML component 206 can determine how a user behaves (e.g., determined to be satisfied with the change in QoS via one or more cues captured via one or more sensors of the mobile device). For example, if a user is determined to utter "oh my gosh, not again," or another utterance determined to comprise a negative sentiment, the QoS component 112 or ML component 206 can determine that the user is not satisfied with a respective data transmission herein. Further, if a user of a mobile device is determined to increase screen brightness (e.g., on the mobile device), the QoS component 112 or ML component 206 can determine that the user can require a higher QoS (e.g., at least for video content). Similarly, if a user is determined to increase an audio level of a mobile device, the QoS component 112 or ML component 206 can determine that the user can require a higher QoS (e.g., at least for audio content). In another example, the condition component 110 and/or ML component 206 can be content or context aware. In this regard, if a user is playing a music video on a mobile device, and the corresponding singer is determined not to be moving much on a stage, the modification component 114 can reduce video QoS in favor of increasing audio QoS.

According to an embodiment, QoS herein can be decreased (e.g., via the modification component 114). For example, if a user is streaming 4K video, and the user is determined (e.g., via the QoS component 112 and/or ML component 206) not to be benefiting from the 4K resolution (e.g., indiscernible from 1080P resolution to the respective user), QoS for the corresponding data transmission can be decreased (e.g., via the modification component 114), because the user will not likely notice the difference, thus reducing strain on a corresponding RAN (e.g., RAN 120). In an embodiment, the modification component 114 can continue reducing QoS (e.g., incrementally) until user satisfaction is determined (e.g., via the QoS component 112) to change (e.g., until user satisfaction reaches a defined or threshold level). It is noted that systems herein can balance between serving optimal quality for a plurality of users, and not over serve content quality. It is further noted that user satisfaction herein can be associated with (e.g., and stored with) user profiles herein, since user satisfaction can vary between users for given content.

According to an embodiment, the server 124 (e.g., a web server) of the RAN 120 can initiate a QoS adjustment herein. For instance, a mobile device can be in communication with a server 124 (e.g., via RAN 120). In one example, the server 124 can be associated with a bank. Thus, in an implementation, the server 124 can request a QoS adjustment (e.g., for a transaction between the server 124 and the mobile device) (e.g., for an important banking transaction). In an example, if the server 124 estimates that the transaction will take one minute to process, the server 124 can request (e.g., from a system herein) a QoS increase for one minute. Next, the modification component 114 can implement the corresponding QoS modification. In another example, the server 124 can be associated with a video streaming service. In this example, during a premiere of a new movie, the server 124 can request a QoS increase for one or more mobile devices (e.g., registered with the video streaming service) during streaming of the premier of the new movie.

In various embodiments, the condition component 110 and/or ML component 206 can determine an important segment of a video or of content transmitted between the RAN 120 and a mobile device. In this regard, the system 102 can gain insight into content transmitted via the RAN 120 (e.g., using the condition component 110 and/or ML component 206). For example, the condition component 110 and/or ML component 206 can determine which portion of a video or stream is important (e.g., to a particular user or a group of users). In this example, if a user has watched certain movies in the past (e.g., history data associated with respective user profile), the condition component 110 and/or ML component 206 can determine respective interests associated with the user and respective user profile. In this regard, if the user is determined to be interested in a particular actor, the modification component 114 can increase QoS for scenes of a movie or television show with that actor (e.g., of data transmissions herein).

The condition component 110 and/or ML component 206 can also base condition determinations on respective mobile device hardware. For example, if a mobile device only has a 720P screen, the modification component 114 can prevent streams at resolutions above 720P (e.g., as such a stream would be wasteful since the 720P screen cannot display resolutions higher than 720P). In another example, if the condition component 110 and/or ML component 206 determines that a mobile device herein has a cracked screen or a broken speaker, the modification component 114 can reduce video or audio quality, respectively. In a further example, the condition component 110 and/or ML component 206 can determine remaining battery life (e.g., of a mobile device herein) or remaining data on a corresponding data plan associated with the mobile device. In this regard, the modification component 114 can reduce QoS in order to reduce battery consumption or reduce data consumption, respectively.

Various embodiments herein can employ artificial-intelligence or machine learning systems and techniques to facilitate learning user behavior, context-based scenarios, preferences, etc. in order to facilitate taking automated action with high degrees of confidence. Utility-based analysis can be utilized to factor benefit of taking an action against cost of taking an incorrect action. Probabilistic or statistical-based analyses can be employed in connection with the foregoing and/or the following.

It is noted that systems and/or associated controllers, servers, or machine learning components herein can comprise artificial intelligence component(s) which can employ an artificial intelligence (A.I.) model and/or M.L. or an M.L. model that can learn to perform the above or below described functions (e.g., via training using historical training data and/or feedback data).

In some embodiments, ML component 206 can comprise an A.I. and/or M.L. model that can be trained (e.g., via supervised and/or unsupervised techniques) to perform the above or below-described functions using historical training data comprising various context conditions that correspond to various augmented network optimization operations. In this example, such an A.I. and/or M.L. model can further learn (e.g., via supervised and/or unsupervised techniques) to perform the above or below-described functions using training data comprising feedback data, where such feedback data can be collected and/or stored (e.g., in memory) by the ML component 206. In this example, such feedback data can comprise the various instructions described above/below that can be input, for instance, to a system herein, over time in response to observed/stored context-based information.

A.I./M.L. components herein can initiate an operation(s) associated with a based on a defined level of confidence determined using information (e.g., feedback data). For example, based on learning to perform such functions described above using feedback data, performance information, and/or past performance information herein, an ML component 206 herein can initiate an operation associated with determining various thresholds herein (e.g., a motion pattern thresholds, input pattern thresholds, similarity thresholds, authentication signal thresholds, audio frequency thresholds, or other suitable thresholds).

In an embodiment, the ML component 206 can perform a utility-based analysis that factors cost of initiating the above-described operations versus benefit. In this embodiment, the ML component 206 can use one or more additional context conditions to determine various thresholds herein.

To facilitate the above-described functions, a ML component 206 herein can perform classifications, correlations, inferences, and/or expressions associated with principles of artificial intelligence. For instance, the ML component 206 can employ an automatic classification system and/or an automatic classification. In one example, the ML component 206 can employ a probabilistic and/or statistical-based analysis (e.g., factoring into the analysis utilities and costs) to learn and/or generate inferences. The ML component 206 can employ any suitable machine-learning based techniques, statistical-based techniques and/or probabilistic-based techniques. For example, the ML component 206 can employ expert systems, fuzzy logic, support vector machines (SVMs), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, and/or the like. In another example, the ML component 206 can perform a set of machine-learning computations. For instance, the ML component 206 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations.

Figure 3:
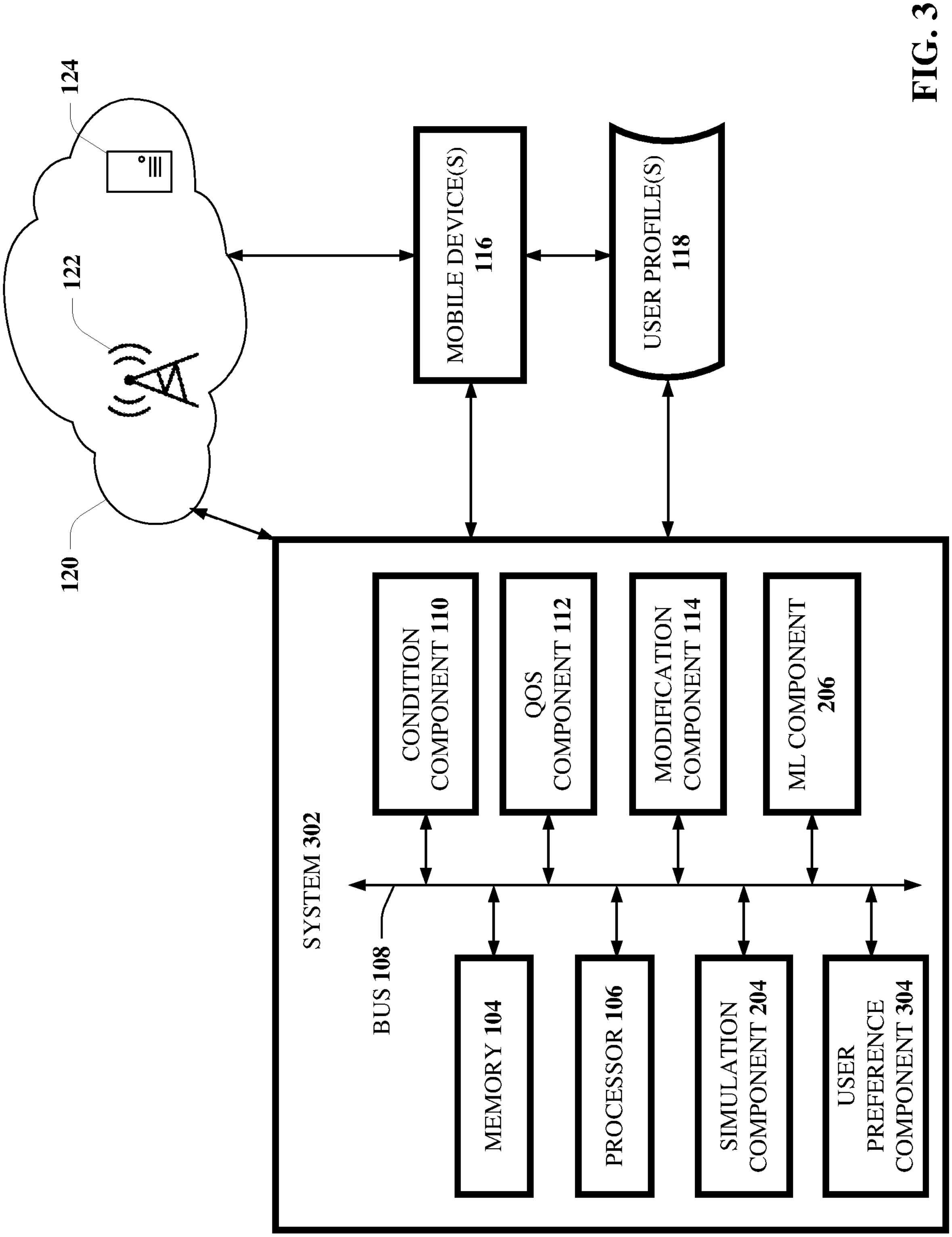
FIG. 3 is a block diagram of an exemplary system in accordance with one or more embodiments described herein.

Turning now to FIG. 3, there is illustrated an example, non-limiting system 302 in accordance with one or more embodiments herein. System 302 can comprise a computerized tool, which can be configured to perform various operations relating to quality of service adjustment. The system 302 can be similar to system 202, and can comprise one or more of a variety of components, such as memory 104, processor 106, bus 108, condition component 110, QoS component 112, modification component 114, simulation component 204 and/or ML component 206. In various embodiments, the system 202 can be communicatively coupled to, or can further comprise, mobile device(s) 116, user profile(s) 118, RAN 120, network equipment 122, and/or server 124. The system 302 can further comprise a user preference component 304. In various embodiments, one or more of the memory 104, processor 106, bus 108, condition component 110, QoS component 112, modification component 114 mobile device(s) 116, user profile(s) 118, RAN 120, network equipment 122, server 124, simulation component 204, ML component 206, and/or user preference component 304 can be communicatively or operably coupled (e.g., over a bus or wireless network) to one another to perform one or more functions of the system 302.

According to an embodiment, the user preference component 304 can determine (e.g., using an artificial intelligence process and/or via the ML component 206), a user preference associated with the user profile and/or associated with a condition herein. In this regard, modifying (e.g., by the modification component 114) the quality of service parameter can be based on the user preference. For example, such as user preference can comprise a heightened QoS when a particular actress is on-screen during a stream of movie, or a heightened QoS when attending a child's game (e.g., and live streaming the child's game via a mobile device herein).

Figure 4:
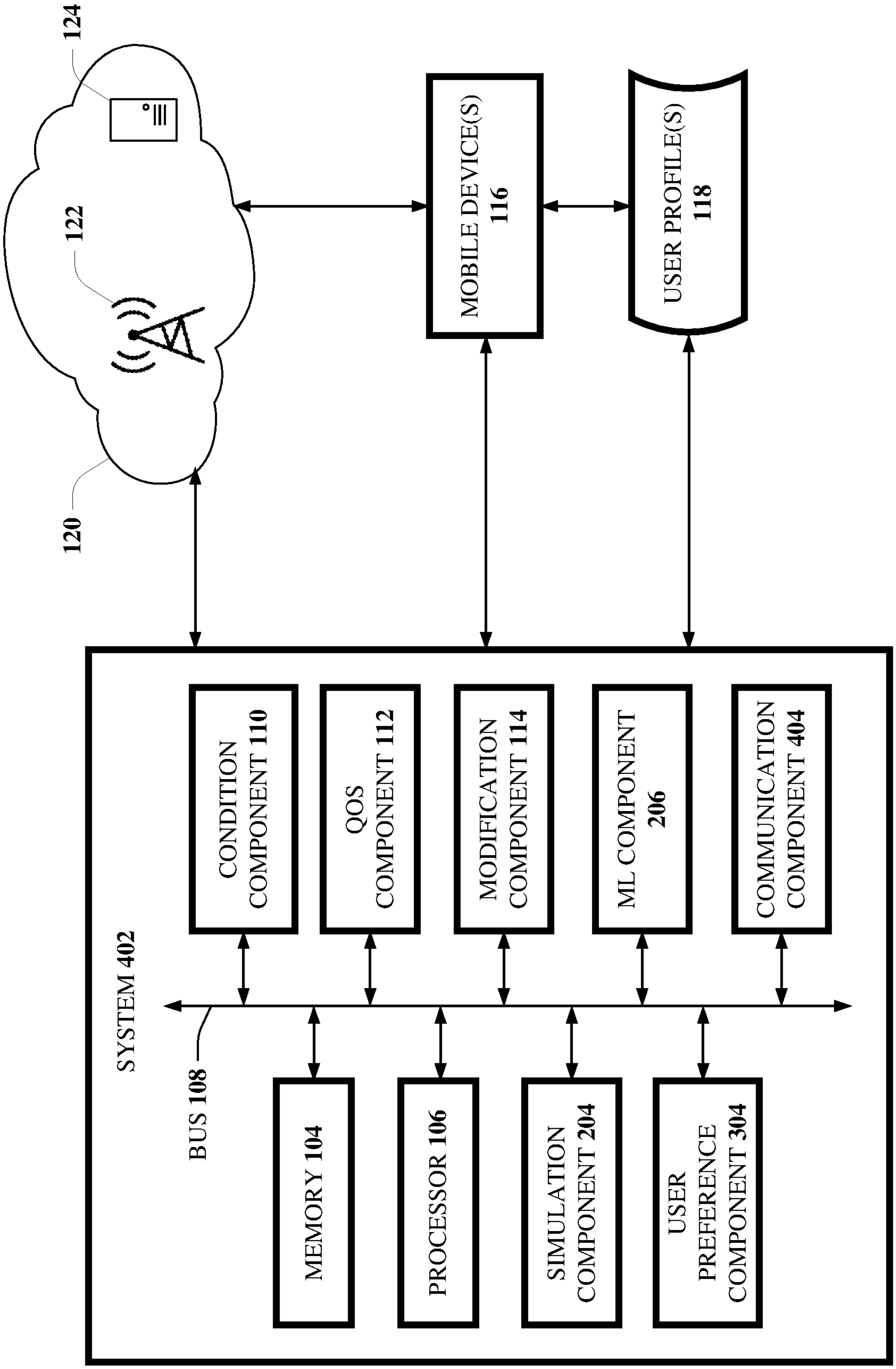
FIG. 4 is a block diagram of an exemplary system in accordance with one or more embodiments described herein.

Turning now to FIG. 4, there is illustrated an example, non-limiting system 402 in accordance with one or more embodiments herein. System 402 can comprise a computerized tool, which can be configured to perform various operations relating to quality of service adjustment. The system 402 can be similar to system 302, and can comprise one or more of a variety of components, such as memory 104, processor 106, bus 108, condition component 110, QoS component 112, modification component 114, simulation component 204 machine learning (ML) component 206, and/or user preference component 304. In various embodiments, the system 402 can be communicatively coupled to, or can further comprise, mobile device(s) 116, user profile(s) 118, RAN 120, network equipment 122, and/or server 124. The system 402 can further comprise a communication component 404. In various embodiments, one or more of the memory 104, processor 106, bus 108, condition component 110, QoS component 112, modification component 114 mobile device(s) 116, user profile(s) 118, RAN 120, network equipment 122, server 124, simulation component 204, ML component 206, user preference component 304, and/or communication component 404 can be communicatively or operably coupled (e.g., over a bus or wireless network) to one another to perform one or more functions of the system 402.

According to an embodiment, the communication component 404 can receive a request from a web server (e.g., server 124) associated with the user profile. In this regard, determining (e.g., by the condition component 110) a condition herein can comprise determining (e.g., by the condition component 110) the condition based on the request (e.g., as received via the communication component 404). It is noted that the communication component 404 can comprise the hardware required to implement a variety of communication protocols (e.g., infrared ("IR"), shortwave transmission, near-field communication ("NFC"), Bluetooth, Wi-Fi, long-term evolution ("LTE"), 3G, 4G, 5G, 6G, global system for mobile communications ("GSM"), code-division multiple access ("CDMA"), satellite, visual cues, radio waves, etc.)

In one or more embodiments, a condition herein can comprise defined network activity between the user equipment (e.g., mobile device) and the web server (e.g., server 124). In various embodiments, the defined network activity comprises a relative importance determined to be higher than relative importances of other data transmissions between the network equipment and other user equipment, other than the user equipment. In various implementations, the relative importance and the relative importances can be determined (e.g., via the ML component 206) using a network activity model. In this regard, the network activity model can be generated (e.g., by the ML component 206) based on machine learning applied to past data transmissions other than the data transmission and the data transmissions.

Figure 5:
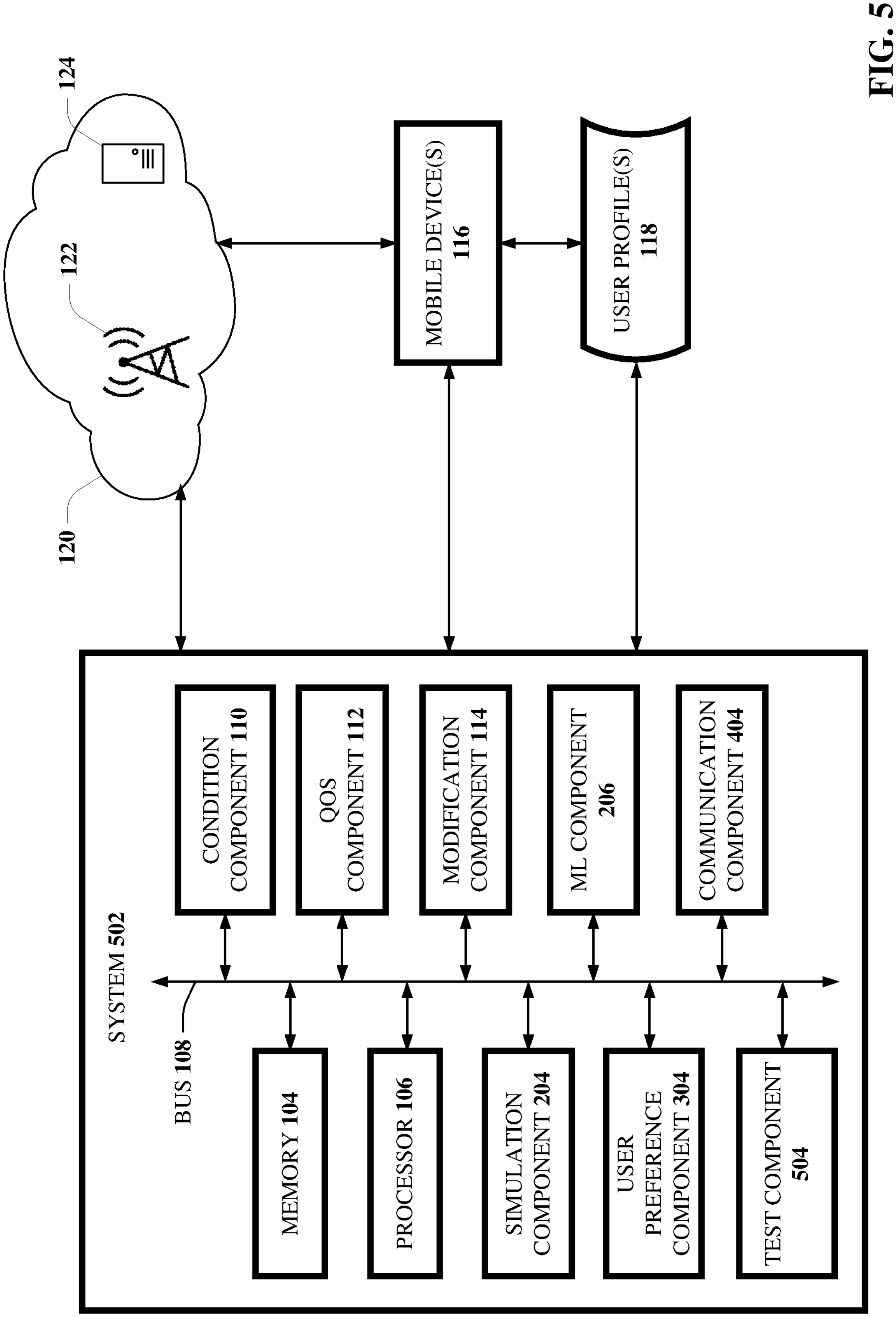
FIG. 5 is a block diagram of an exemplary system in accordance with one or more embodiments described herein.

Turning now to FIG. 5, there is illustrated an example, non-limiting system 502 in accordance with one or more embodiments herein. System 502 can comprise a computerized tool, which can be configured to perform various operations relating to quality of service adjustment. The system 502 can be similar to system 402, and can comprise one or more of a variety of components, such as memory 104, processor 106, bus 108, condition component 110, QoS component 112, modification component 114, simulation component 204, ML component 206, user preference component 304 and/or communication component 404. In various embodiments, the system 402 can be communicatively coupled to, or can further comprise, mobile device(s) 116, user profile(s) 118, RAN 120, network equipment 122, and/or server 124. The system 502 can further comprise a test component 504. In various embodiments, one or more of the memory 104, processor 106, bus 108, condition component 110, QoS component 112, modification component 114 mobile device(s) 116, user profile(s) 118, RAN 120, network equipment 122, server 124, simulation component 204, ML component 206, user preference component 304, communication component 404, and/or test component 504 can be communicatively or operably coupled (e.g., over a bus or wireless network) to one another to perform one or more functions of the system 502.

According to an embodiment, the test component 504 can, based on the quality of service, generate a test to be presented via the mobile device. In this regard, the quality of service can be modified (e.g., by the modification component 114) based on a result of the test. According to an embodiment, the test component 504 can prompt a user for input (e.g., via a corresponding mobile device herein). According to an example, the test component 504 can present two similar images (e.g., common images of different resolutions). If the test component 504 receives an input that the user cannot perceive a difference, the modification component 114 can lower QoS (e.g., incrementally) until an input indicative of a perceived difference is received. Similarly, the test component 504 can present two similar audio clips (e.g., common audio clips of different bitrates). If the test component 504 receives an input that the user cannot perceive a difference, the modification component 114 can lower QoS (e.g., incrementally) until an input indicative of a perceived difference is received. In various embodiments, the test component 504 can update a respective user profile according to user preference determinations (e.g., made by the test component 504).

Figure 6:
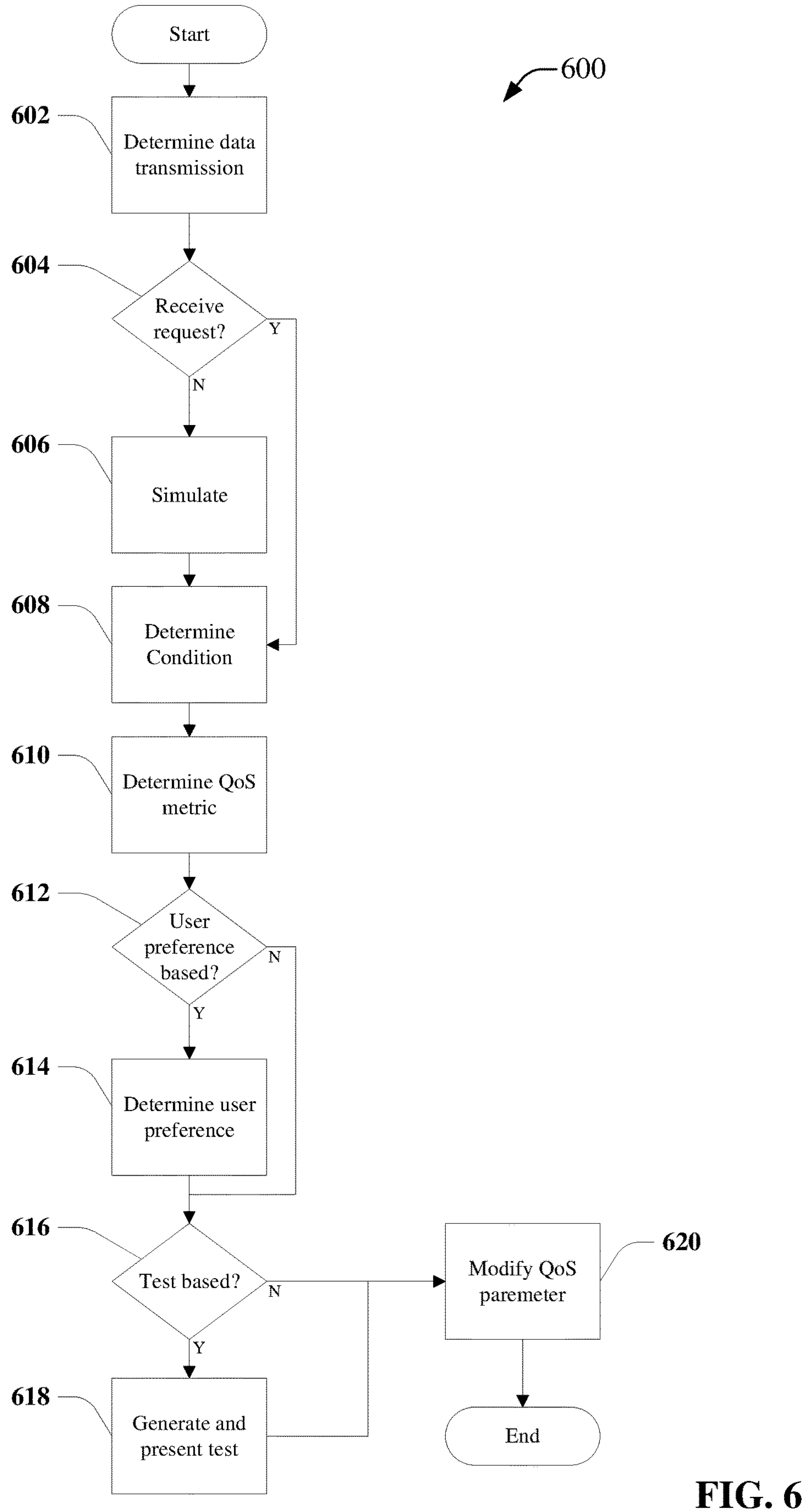
FIG. 6 is a flowchart for a process associated with quality of service adjustment in accordance with one or more embodiments described herein.

Turning now to FIG. 6, there is illustrated a flowchart of a process 600 relating to quality of service adjustment in accordance with one or more embodiments described herein. At 602, a data transmission (e.g., via a RAN 120) can be determined (e.g., by a condition component 110 and/or QoS component 112). At 604, if a request (e.g., a QoS adjustment request) is received (e.g., via a communication component 404) (e.g., Y at 604) from a web server (e.g., server 124 or from another entity, component, or system), the process can proceed to 608. If a request is not received at 604, the process can proceed to 606. At 606, based on the data transmission, the simulation component (e.g., simulation component 204) can simulate (e.g., using an artificial intelligence process and/or using ML component 206) a user experience applicable to a mobile device herein. At 608, a condition component 110 can determine a condition associated with a user profile (e.g., and associated with the respective mobile device). At 610, the QoS component 112 can determine a QoS metric representative of a QoS of the data transmission (e.g., via the RAN 120) (e.g., between the mobile device and network equipment (e.g., network equipment 122) or a system herein). At 612, if a system herein is to make a QoS modification based on a user preference (e.g., based on a setting) (e.g., Y at 612) the process can proceed to 614, else the process can proceed to 616. At 614, the user preference component 304 can determine (e.g., using an artificial intelligence process and/or via ML component 206) a user preference associated with a user profile herein and associated with a condition herein. At 616, if a system herein is to make a QoS modification based on a test (e.g., based on a setting) (e.g., Y at 616) the process can proceed to 618, else the process can proceed to 620. At 618, the test component 504 can, based on a QoS (e.g., as determined by the QoS component 112), generate a test to be presented via a mobile device herein. At 620, the modification component 114 can modify QoS herein based on the user preference and/or the result of the test.

Figure 7:
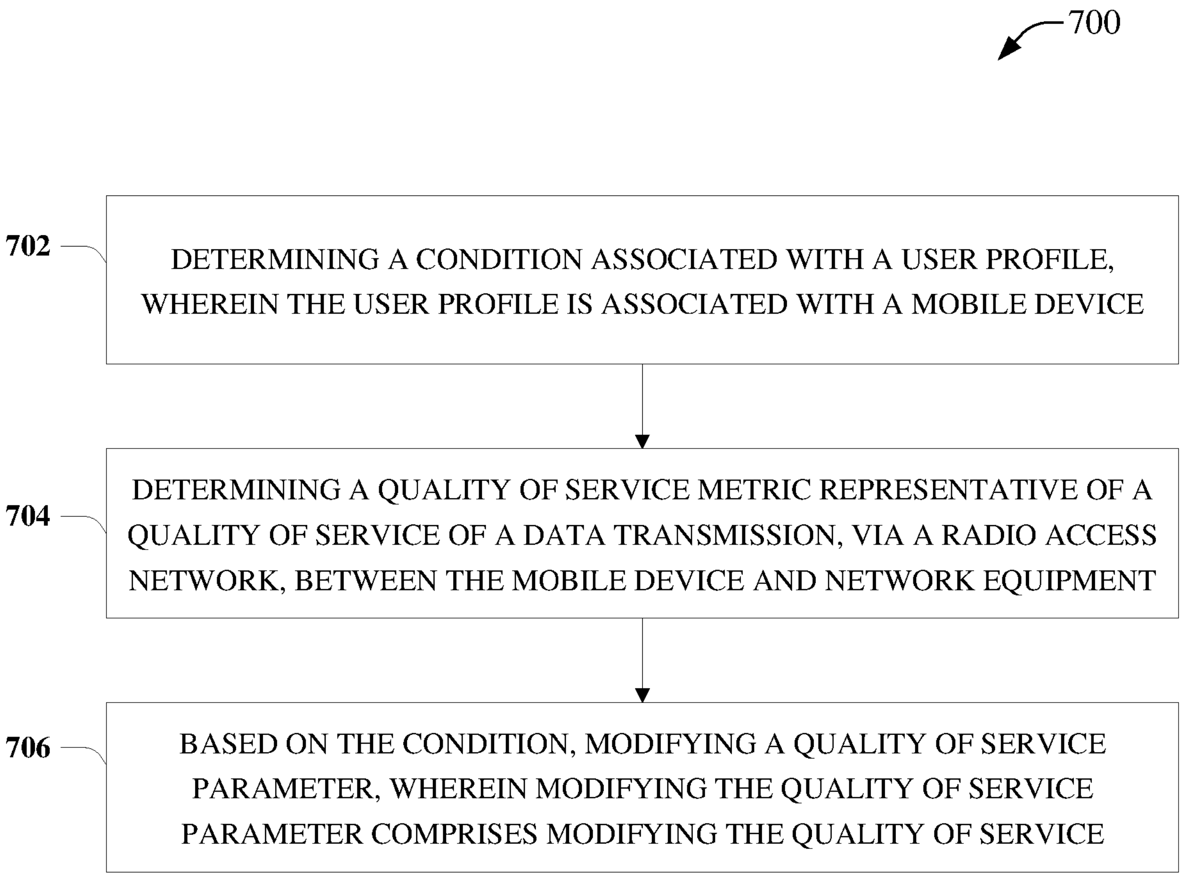
FIG. 7 is a block flow diagram for a process associated with quality of service adjustment in accordance with one or more embodiments described herein.

FIG. 7 illustrates a block flow diagram for a process 700 associated with quality of service adjustment in accordance with one or more embodiments described herein. At 702, the process 700 can comprise determining (e.g., by the condition component 110) a condition associated with a user profile (e.g., of user profile(s) 118), wherein the user profile is associated with a mobile device (e.g., of mobile device(s) 116). At 704, the process 700 can comprise determining (e.g., by the QoS component 112) a quality of service metric representative of a quality of service of a data transmission, via a radio access network (e.g., RAN 120), between the mobile device and network equipment (e.g., network equipment 122 or a system herein). At 706, the process 700 can comprise, based on the condition, modifying (e.g., by the modification component 114) a quality of service parameter, wherein modifying the quality of service parameter comprises modifying (e.g., by the modification component 114) the quality of service.

Figure 8:
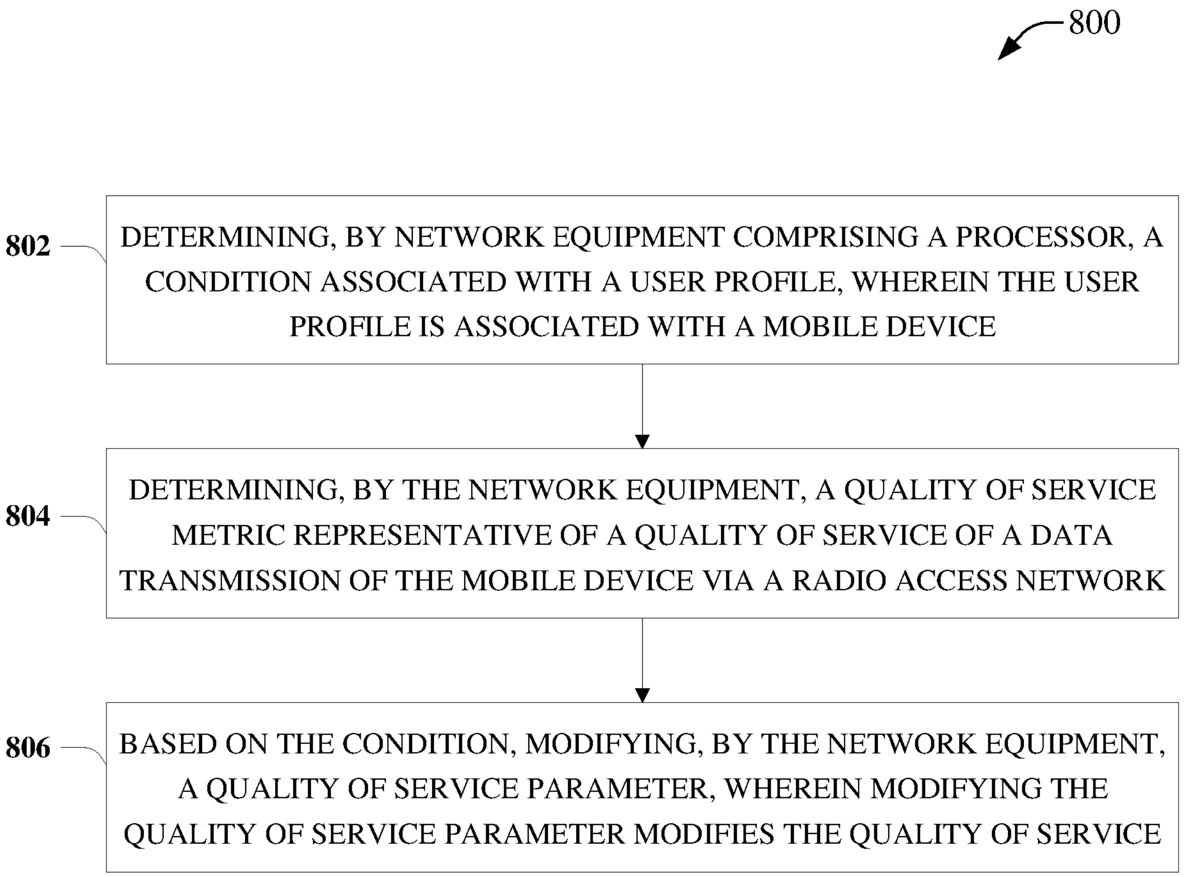
FIG. 8 is a block flow diagram for a process associated with quality of service adjustment in accordance with one or more embodiments described herein.

FIG. 8 illustrates a block flow diagram for a process 800 associated with quality of service adjustment in accordance with one or more embodiments described herein. At 802, the process 800 can comprise determining, by network equipment comprising a processor (e.g., via the condition component 110), a condition associated with a user profile (e.g., of the user profile(s) 118), wherein the user profile is associated with a mobile device (e.g., of the mobile device(s) 116). At 804, the process 800 can comprise determining, by the network equipment (e.g., via the QoS component 112), a quality of service metric representative of a quality of service of a data transmission of the mobile device (e.g., of the mobile device(s) 116) via a radio access network (e.g., RAN 120). At 806, the process 800 can comprise, based on the condition, modifying, by the network equipment (e.g., via the modification component 114), a quality of service parameter, wherein modifying the quality of service parameter modifies (e.g., via the modification component 114) the quality of service.

Figure 9:
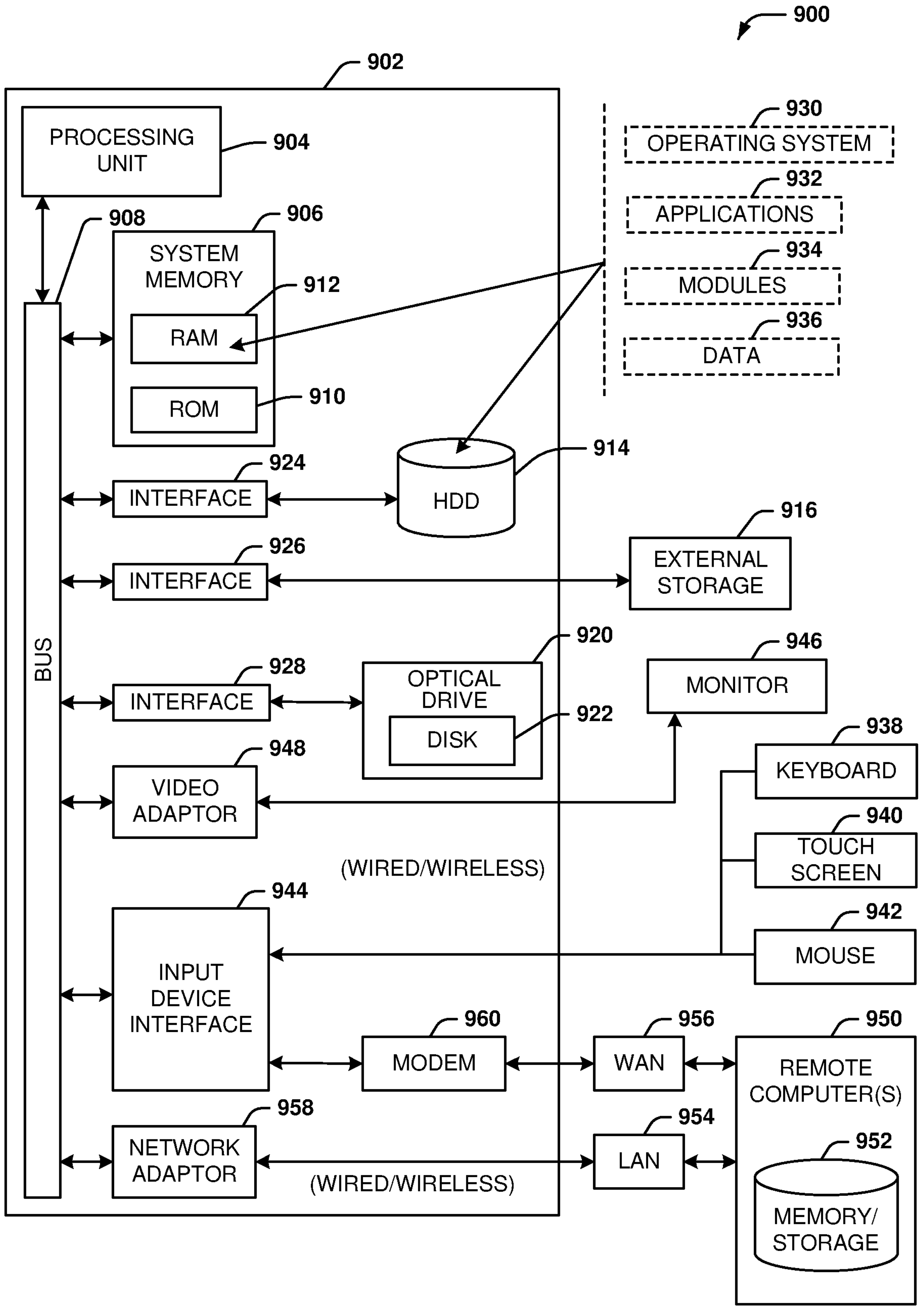
FIG. 9 is an example, non-limiting computing environment in which one or more embodiments described herein can be implemented.

In order to provide additional context for various embodiments described herein, FIG. 9 and the following discussion are intended to provide a brief, general description of a suitable computing environment 900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared, and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), one or more external storage devices 916 (e.g., a magnetic floppy disk drive (FDD) 916, a memory stick or flash drive reader, a memory card reader, etc.) and an optical disk drive 920 (e.g., which can read or write from a CD-ROM disc, a DVD, a BD, etc.). While the internal HDD 914 is illustrated as located within the computer 902, the internal HDD 914 can also be configured for external use in a suitable chassis (not shown). Additionally, while not shown in environment 900, a solid-state drive (SSD) could be used in addition to, or in place of, an HDD 914. The HDD 914, external storage device(s) 916 and optical disk drive 920 can be connected to the system bus 908 by an HDD interface 924, an external storage interface 926 and an optical drive interface 928, respectively. The interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In such an embodiment, operating system 930 can comprise one virtual machine (VM) of multiple VMs hosted at computer 902. Furthermore, operating system 930 can provide runtime environments, such as the Java runtime environment or the .NET framework, for applications 932. Runtime environments are consistent execution environments that allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and settings for an application.

Further, computer 902 can be enable with a security module, such as a trusted processing module (TPM). For instance, with a TPM, boot components hash next in time boot components, and wait for a match of results to secured values, before loading a next boot component. This process can take place at any layer in the code execution stack of computer 902, e.g., applied at the application execution level or at the operating system (OS) kernel level, thereby enabling security at any level of code execution.

A user can enter commands and information into the computer 902 through one or more wired/wireless input devices, e.g., a keyboard 938, a touch screen 940, and a pointing device, such as a mouse 942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 904 through an input device interface 944 that can be coupled to the system bus 908, but can be connected by other interfaces, such as a parallel port, an IEEE 1394 serial port, a game port, a USB port, an IR interface, a BLUETOOTH® interface, etc.

A monitor 946 or other type of display device can be also connected to the system bus 908 via an interface, such as a video adapter 948. In addition to the monitor 946, a computer typically includes other peripheral output devices (not shown), such as speakers, printers, etc.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 952 is illustrated. The logical connections depicted include wired/wireless connectivity to a local area network (LAN) 954 and/or larger networks, e.g., a wide area network (WAN) 956. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 954 through a wired and/or wireless communication network interface or adapter 958. The adapter 958 can facilitate wired or wireless communication to the LAN 954, which can also include a wireless access point (AP) disposed thereon for communicating with the adapter 958 in a wireless mode.

When used in a WAN networking environment, the computer 902 can include a modem 960 or can be connected to a communications server on the WAN 956 via other means for establishing communications over the WAN 956, such as by way of the Internet. The modem 960, which can be internal or external and a wired or wireless device, can be connected to the system bus 908 via the input device interface 944. In a networked environment, program modules depicted relative to the computer 902 or portions thereof, can be stored in the remote memory/storage device 952. It will be appreciated that the network connections shown are example and other means of establishing a communications link between the computers can be used.

When used in either a LAN or WAN networking environment, the computer 902 can access cloud storage systems or other network-based storage systems in addition to, or in place of, external storage devices 916 as described above. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 10:
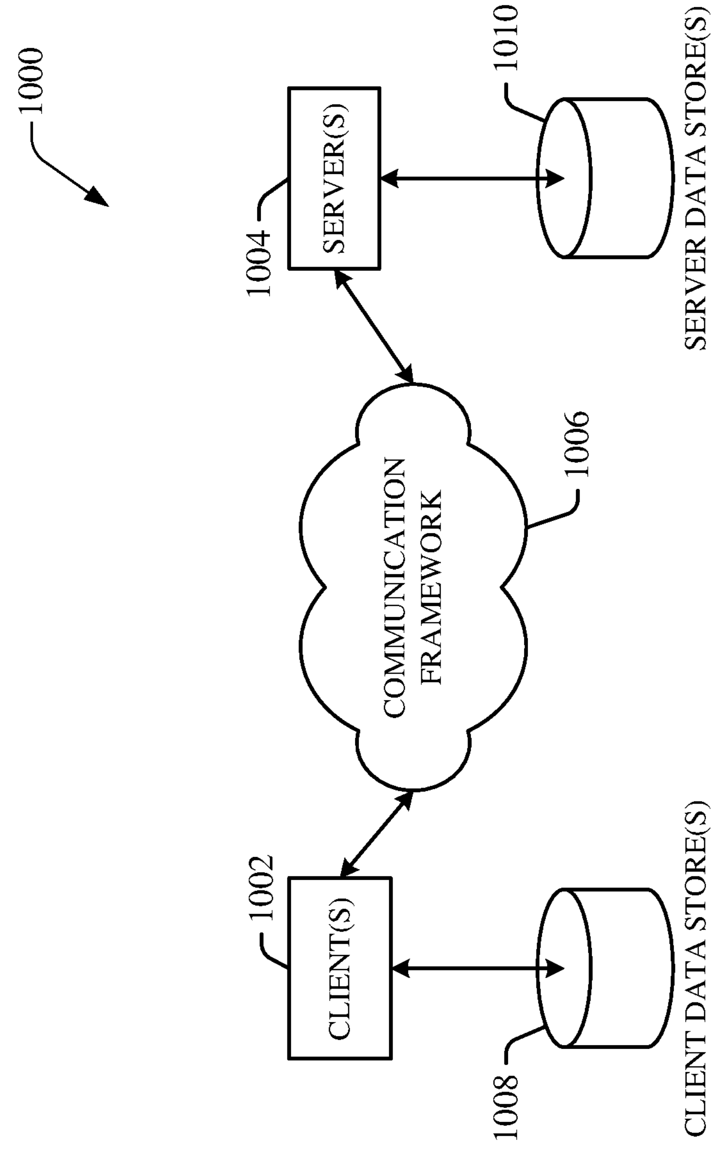
FIG. 10 is an example, non-limiting networking environment in which one or more embodiments described herein can be implemented.

Referring now to FIG. 10, there is illustrated a schematic block diagram of a computing environment 1000 in accordance with this specification. The system 1000 includes one or more client(s) 1002, (e.g., computers, smart phones, tablets, cameras, PDA's). The client(s) 1002 can be hardware and/or software (e.g., threads, processes, computing devices). The client(s) 1002 can house cookie(s) and/or associated contextual information by employing the specification, for example.

The system 1000 also includes one or more server(s) 1004. The server(s) 1004 can also be hardware or hardware in combination with software (e.g., threads, processes, computing devices). The servers 1004 can house threads to perform transformations of media items by employing aspects of this disclosure, for example. One possible communication between a client 1002 and a server 1004 can be in the form of a data packet adapted to be transmitted between two or more computer processes wherein data packets may include coded analyzed headspaces and/or input. The data packet can include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

In one exemplary implementation, a client 1002 can transfer an encoded file, (e.g., encoded media item), to server 1004. Server 1004 can store the file, decode the file, or transmit the file to another client 1002. It is noted that a client 1002 can also transfer uncompressed file to a server 1004 and server 1004 can compress the file and/or transform the file in accordance with this disclosure. Likewise, server 1004 can encode information and transmit the information via communication framework 1006 to one or more clients 1002.

The illustrated aspects of the disclosure may also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities.

Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:

a processor; and a memory that stores executable instructions that, when executed by the processor, facilitate performance of operations, comprising:

determining a quality of service metric representative of a quality of service of a data transmission, via a radio access network, between a mobile device and network equipment;

determining a condition associated with a user profile, wherein the user profile is associated with the mobile device, and wherein the determining the condition comprises:

based on the data transmission, simulating, using an artificial intelligence process, a user experience applicable to the mobile device, wherein the user experience includes a first video or audio feed being played on the mobile device, and wherein the simulating the user experience includes:

processing a second video or audio feed that duplicates the first video or audio feed separate from interaction with the mobile device;

determining, using the artificial intelligence process, a predicted user action to be performed with the first video or audio feed; and testing the predicted user action on the second video or audio feed;

based on the testing the predicted user action, determining the condition; and based on the condition and the second video or audio feed, modifying a quality of service parameter, wherein the modifying the quality of service parameter comprises modifying the quality of service.

2. The system of claim 1, wherein the modifying the quality of service parameter comprises:

modifying a bandwidth of the data transmission.

3. The system of claim 1, wherein the modifying the quality of service parameter comprises modifying a quality of service class identifier of the data transmission.

4. The system of claim 1, wherein the operations further comprise:

determining, using the artificial intelligence process, a user preference associated with the user profile and associated with the condition, wherein the modifying the quality of service parameter is based on the user preference.

5. The system of claim 1, wherein the condition comprises an occurrence of an event at a location, and wherein the modifying the quality of service parameter comprises modifying the quality of service parameter in response to a determination that the mobile device is within a threshold distance of the location.

6. The system of claim 1, wherein the condition comprises an occurrence of an event at a defined time, and wherein the modifying the quality of service parameter comprises modifying the quality of service at the defined time.

7. A non-transitory machine-readable medium, comprising executable instructions that, when executed by a processor, facilitate performance of operations, comprising:

determining a quality of service metric representative of a quality of service of a data transmission, via a radio access network, between user equipment and network equipment;

determining a condition associated with a user profile, wherein the user profile is associated with the user equipment, and wherein the determining the condition comprises:

based on the data transmission, simulating, using an artificial intelligence process, a user experience applicable to the user equipment, wherein the user experience includes a first video or audio feed, and wherein the simulating the user experience includes:

processing a second video or audio feed that duplicates the first video or audio feed while the first video or audio feed plays on the user equipment, determining, using the artificial intelligence process, a predicted user action to be performed with the first video or audio feed; and testing the predicted user action on the second video or audio feed;

based on the testing the predicted user action, determining the condition; and based on the condition and the second video or audio feed, modifying a quality of service parameter, wherein the modifying the quality of service parameter results in the quality of service being modified.

8. The non-transitory machine-readable medium of claim 7, wherein the operations further comprise:

receiving a request from a web server associated with the user profile, wherein the determining the condition further comprises determining the condition based on the request.

9. The non-transitory machine-readable medium of claim 8, wherein the condition comprises defined network activity between the user equipment and the web server.

10. The non-transitory machine-readable medium of claim 9, wherein the defined network activity comprises a relative importance determined to be higher than relative importances of other data transmissions between the network equipment and other user equipment, other than the user equipment.

11. The non-transitory machine-readable medium of claim 10, wherein the relative importance and the relative importances are determined using a network activity model, and wherein the network activity model has been generated based on machine learning applied to past data transmissions other than the data transmission and the other data transmissions.

12. A method, comprising:

determining, by network equipment comprising a processor, a quality of service metric representative of a quality of service of a data transmission of a mobile device via a radio access network;

determining, by the network equipment, a condition associated with a user profile, wherein the user profile is associated with the mobile device, and wherein the determining the condition comprises:

based on the data transmission, simulating, using an artificial intelligence process, a user experience applicable to the mobile device, wherein the user experience includes a first video or audio feed playing on the mobile device, and wherein the simulating the user experience includes:

predicting an interaction to be performed with the first video or audio feed, and processing a second video or audio feed that duplicates the first video or audio feed by testing the interaction on the second video or audio feed;

based on the testing the interaction, determining the condition; and based on the condition and the second video or audio feed, modifying, by the network equipment, a quality of service parameter, wherein the modifying the quality of service parameter modifies the quality of service.

13. The method of claim 12, further comprising:

based on the quality of service, generating, by the network equipment, a test to be presented via the mobile device, wherein the quality of service is modified based on a result of the test.

14. The method of claim 12, further comprising:

identifying, by the network equipment, an event threshold likely to reduce the quality of service by at least a defined amount; and based on the condition and the event threshold, allocating, by the network equipment, a defined quality of service for a defined amount of time to the mobile device.

15. The method of claim 14, further comprising:

based on the event threshold, reducing, by the network equipment, a first throughput of a first type of data transmission, of the data transmission; and further based on the event threshold, increasing, by the network equipment, a second throughput of a second type of data transmission, of the data transmission, different from the first type of data transmission.

16. The method of claim 12, wherein the user profile is a first user profile, the quality of service parameter is a first quality of service parameter, and the mobile device is a first mobile device, wherein the data transmission of the first mobile device, via the radio access network, is between the first mobile device and a second mobile device associated with a second user profile, and wherein the method further comprises:

based on modifying the first quality of service parameter, modifying a second quality of service parameter corresponding to the second mobile device.

17. The method of claim 12, wherein the modifying the quality of service parameter comprises modifying a bandwidth allocation of a network slice, of the radio access network, comprising the data transmission.

18. The system of claim 1, wherein the network equipment comprises network equipment that communicates according to at least a fifth generation network communication protocol.

19. The system of claim 1, wherein the modifying the quality of service parameter comprises reducing video quality of service and increasing audio quality of service in response to determining, using the artificial intelligence process, that the first video or audio feed includes low-motion video content.

20. The system of claim 1, wherein the operations further comprise:

determining, using the artificial intelligence process, that the mobile device includes a damaged display or a damaged speaker, wherein the modifying the quality of service parameter comprises reducing a video quality setting in response to the damaged display or reducing an audio quality setting in response to the damaged speaker.

* * * * *